US010114912B1

United States Patent
Heaton

(10) Patent No.: US 10,114,912 B1
(45) Date of Patent: Oct. 30, 2018

(54) SYSTEM AND METHOD FOR MONITORING ADDRESS TRAFFIC IN AN ELECTRONIC DESIGN

(71) Applicant: Cadence Design Systems, Inc., San Jose, CA (US)

(72) Inventor: Nicholas Allan Heaton, Maidenhead (GB)

(73) Assignee: Cadence Design Systems, Inc., San Jose, CA (US)

( * ) Notice: Subject to any disclaimer, the term of this patent is extended or adjusted under 35 U.S.C. 154(b) by 810 days.

(21) Appl. No.: 14/225,953

(22) Filed: Mar. 26, 2014

(51) Int. Cl.
*G06F 17/50* (2006.01)

(52) U.S. Cl.
CPC ................. *G06F 17/5009* (2013.01)

(58) Field of Classification Search
CPC ....... G11C 8/20; G11C 5/066; G06F 17/5009; G06F 3/0383
See application file for complete search history.

(56) References Cited

U.S. PATENT DOCUMENTS

| | | | | |
|---|---|---|---|---|
| 3,255,438 A * | 6/1966 | Leonard | G06F 13/4022 | 711/4 |
| 5,535,331 A * | 7/1996 | Swoboda | G01B 31/318342 | 712/E9.016 |
| 6,507,921 B1 * | 1/2003 | Buser | G06F 5/01 | 712/E9.019 |
| 7,725,848 B2 * | 5/2010 | Nebel | G06F 17/5022 | 716/104 |
| 2002/0038439 A1 * | 3/2002 | Sato | G01R 31/31813 | 714/724 |
| 2003/0070113 A1 * | 4/2003 | Ferguson | H04L 1/22 | 714/5.11 |
| 2010/0017580 A1 * | 1/2010 | Greenhalgh | G06F 9/30145 | 712/205 |
| 2010/0162084 A1 * | 6/2010 | Coulson | G06F 11/1068 | 714/773 |
| 2010/0275074 A1 * | 10/2010 | Nicolaidis | G11C 29/16 | 714/718 |

(Continued)

OTHER PUBLICATIONS

Hamdioui et al., March SS: A Test for All Static Simple RAM Faults, IEEE International Workshop on Memory Technology, Design and Testing (MTDT 2002).*

*Primary Examiner* — Omar F Fernandez Rivas
*Assistant Examiner* — Justin C Mikowski
(74) *Attorney, Agent, or Firm* — Mark H. Whittenberger, Esq.; Holland & Knight LLP

(57) ABSTRACT

The present disclosure relates to a computer-implemented method for electronic design simulation is provided. Embodiments may include providing, using one or more processors, an electronic design configured to generate one or more address sequences. Embodiments may also include applying an address noise monitor to the electronic design, wherein the address noise monitor is configured to determine address noise data, wherein the address noise data includes a measure of one or more discontinuities in the one or more address sequences. Embodiments may further include simulating the electronic design to generate one or more performance results, the one or more performance results including address noise data. Embodiments may also include generating an address noise profile, based upon, at least in part, the one or more performance results including address noise data.

9 Claims, 12 Drawing Sheets

(56) References Cited

U.S. PATENT DOCUMENTS

| | | | |
|---|---|---|---|
| 2010/0332909 A1* | 12/2010 | Larson | G06F 11/3476 714/40 |
| 2012/0042212 A1* | 2/2012 | Laurenti | G06F 11/3466 714/45 |
| 2012/0066551 A1* | 3/2012 | Palus | G06F 11/3636 714/39 |
| 2015/0074328 A1* | 3/2015 | Baryudin | G06F 3/0616 711/103 |

* cited by examiner

SYSTEM AND METHOD FOR MONITORING ADDRESS TRAFFIC IN AN ELECTRONIC DESIGN

FIELD OF THE INVENTION

The present disclosure relates to electronic design simulation, and more specifically, to a method for monitoring address traffic during an electronic design simulation.

DISCUSSION OF THE RELATED ART

Electronic design automation (EDA) utilizes software tools that may be used in the design and analysis of numerous electronic systems such as printed circuit boards (PCBs) and integrated circuits (ICs). Verification environments include constraints that describe the relationship between the variables that control the simulation (and sometimes the data that is used as well). For example, in order to verify certain IC designs many simulations are run, which may verify different aspects of the design being tested. Each test may run for a certain amount of design time (usually measured in clock cycles) and a certain amount of user time.

In some cases, designers find it difficult to describe what types of traffic may be generated by their electronic design. For example, many designs generate sequences of addresses when bursting data to and from memory. These could be incrementing or decrementing address sequences. The concept of address noise relates to a measure of the frequency of discontinuities in these address sequences. For example, DDR controllers generally attempt to predict and spot close sequences of related addresses. The amount of noise may directly affect system performance.

SUMMARY

In one or more embodiments of the present disclosure, a computer-implemented method for electronic design simulation is provided. The method may include providing, using one or more processors, an electronic design configured to generate one or more address sequences. The method may also include applying an address noise monitor to the electronic design, wherein the address noise monitor is configured to determine address noise data, wherein the address noise data includes a measure of one or more discontinuities in the one or more address sequences. The method may further include simulating the electronic design to generate one or more performance results, the one or more performance results including address noise data. The method may also include generating an address noise profile, based upon, at least in part, the one or more performance results including address noise data.

One or more of the following features may be included. In some embodiments, the method may include applying the address noise profile to a second electronic design. The method may include simulating the second electronic design including the address noise profile. In some embodiments, the first and second electronic design may be at least one of the same design and different designs. The method may also include refining a number of address bins associated with an address bus of the electronic design. The method may further include determining a gap between the one or more discontinuities. The method may include determining a variance associated with each of the address bins.

In some embodiments, a computer-readable storage medium for electronic design simulation is provided. The computer-readable storage medium may have stored thereon instructions, which when executed by a processor result in one or more operations. Operations may include providing, using one or more processors, an electronic design configured to generate one or more address sequences. Operations may also include applying an address noise monitor to the electronic design, wherein the address noise monitor is configured to determine address noise data, wherein the address noise data includes a measure of one or more discontinuities in the one or more address sequences. Operations may further include simulating the electronic design to generate one or more performance results, the one or more performance results including address noise data. Operations may also include generating an address noise profile, based upon, at least in part, the one or more performance results including address noise data.

One or more of the following features may be included. In some embodiments, operations may include applying the address noise profile to a second electronic design. Operations may include simulating the second electronic design including the address noise profile. In some embodiments, the first and second electronic design may be at least one of the same design and different designs. Operations may also include refining a number of address bins associated with an address bus of the electronic design. Operations may further include determining a gap between the one or more discontinuities. Operations may include determining a variance associated with each of the address bins.

In one or more embodiments of the present disclosure, a system is provided. The system may include one or more processors configured to provide an electronic design configured to generate one or more address sequences. The one or more processors may be further configured to apply an address noise monitor to the electronic design, wherein the address noise monitor is configured to determine address noise data, wherein the address noise data includes a measure of one or more discontinuities in the one or more address sequences. The one or more processors may be further configured to simulate the electronic design to generate one or more performance results, the one or more performance results including address noise data. The one or more processors may be further configured to generate an address noise profile, based upon, at least in part, the one or more performance results including address noise data.

One or more of the following features may be included. In some embodiments, the one or more processors may be further configured to apply the address noise profile to a second electronic design. The one or more processors may be further configured to simulate the second electronic design including the address noise profile. In some embodiments, the first and second electronic design may be at least one of the same design and different designs. The one or more processors may be further configured to refine a number of address bins associated with an address bus of the electronic design. The one or more processors may be further configured to determine a gap between the one or more discontinuities.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
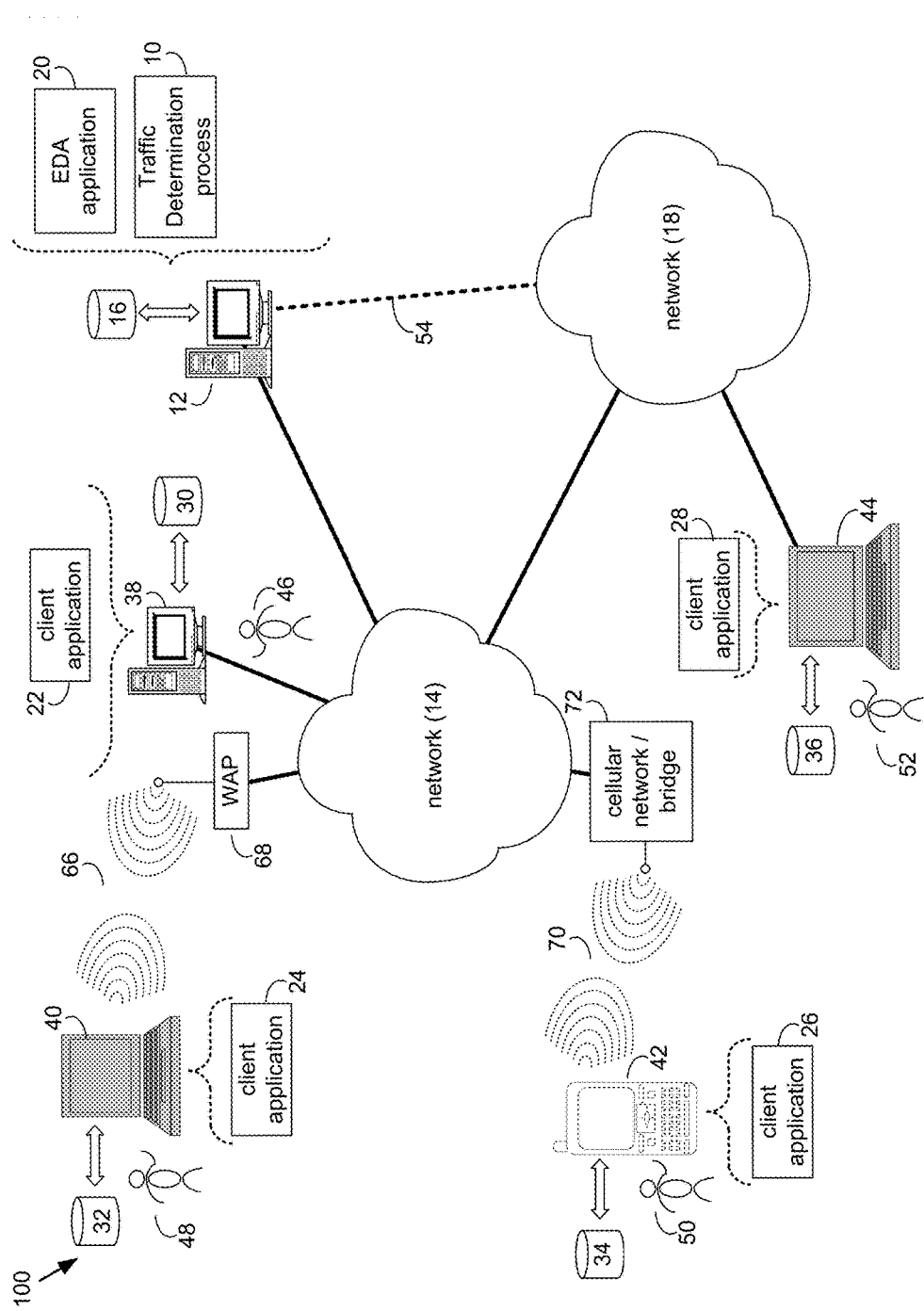
FIG. 1 is a system diagram depicting aspects of the traffic determination process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a traffic determination process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the traffic determination process may reside on and be executed, in whole or in part, by a client electronic device, such as a personal computer, notebook computer, personal digital assistant, or the like.

The instruction sets and subroutines of traffic determination process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Traffic determination process 10 may be a stand alone application, or may be an applet/application/script that may interact with and/or be executed within EDA application 20. In addition/as an alternative to being a server-side process, the traffic determination process may be a client-side process (not shown) that may reside on a client electronic device (described below) and may interact with an EDA client application (e.g., one or more of EDA client applications 22, 24, 26, 28). Further, the traffic determination process may be a hybrid server-side/client-side process that may interact with EDA application 20 and an EDA client application (e.g., one or more of client applications 22, 24, 26, 28). As such, the traffic determination process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize traffic determination process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
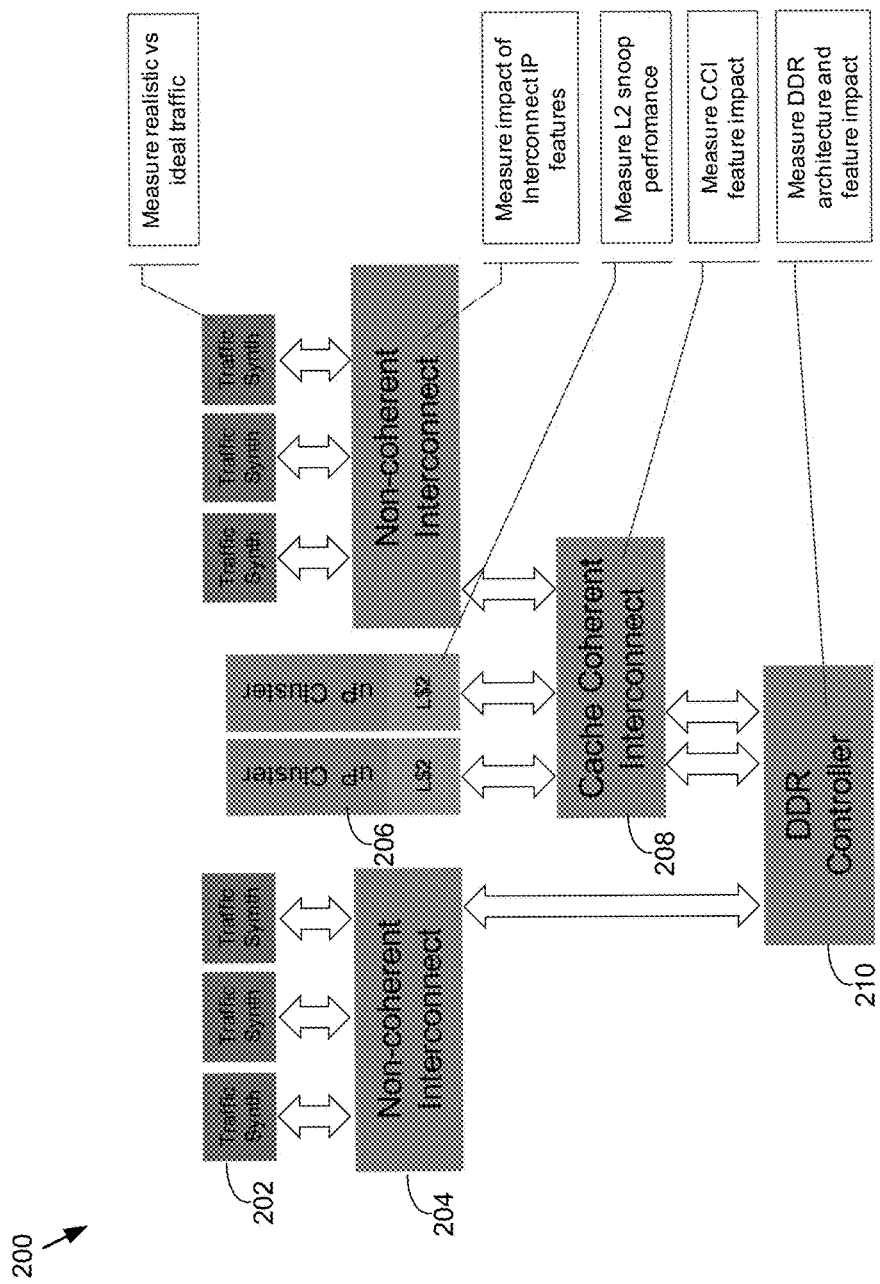
FIG. 2 is a system diagram depicting aspects of the traffic determination process in accordance with an embodiment of the present disclosure.
Figure 3:
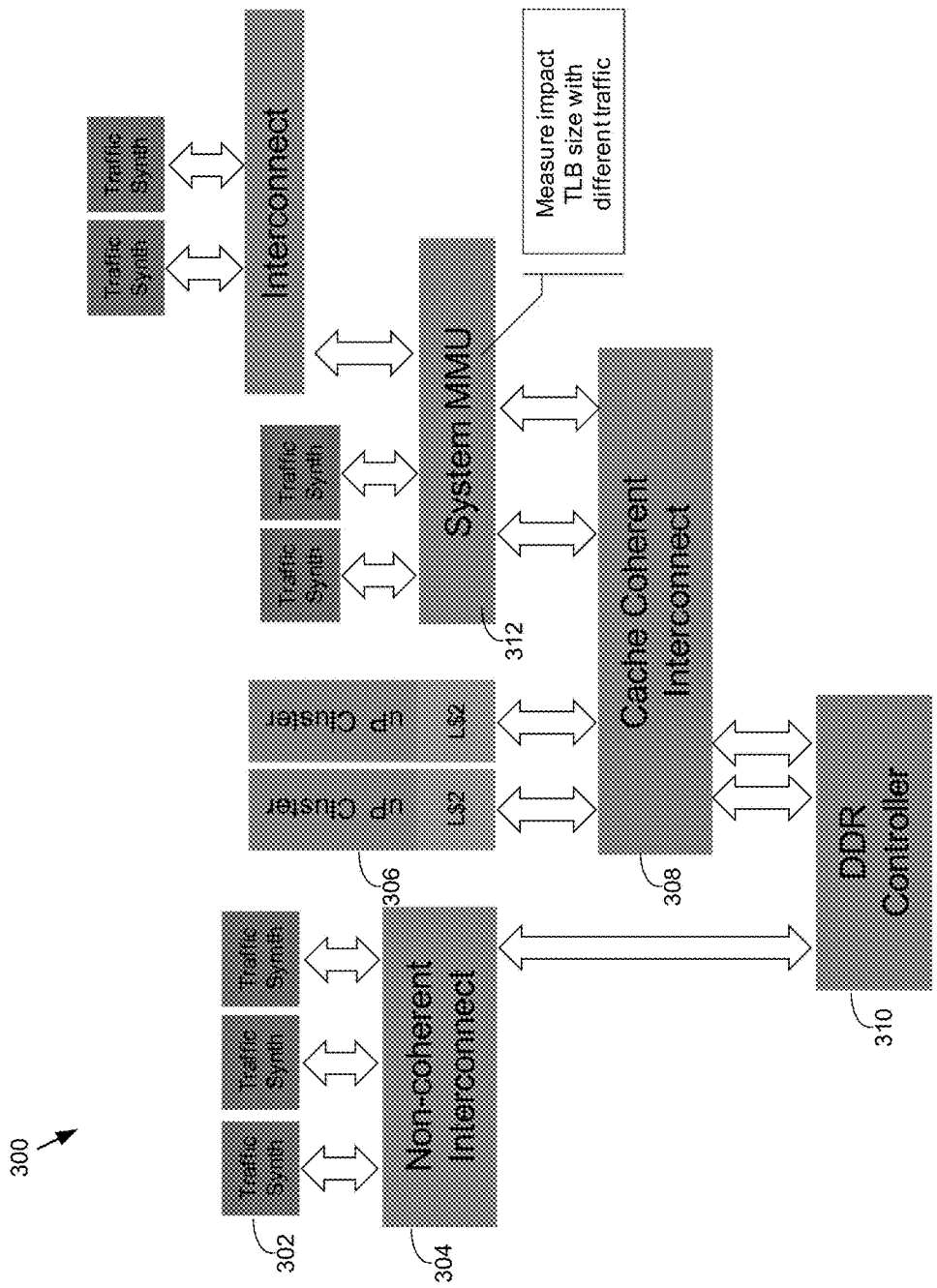
FIG. 3 is a system diagram depicting aspects of the traffic determination process in accordance with an embodiment of the present disclosure.

Referring now to FIGS. 2-3, embodiments depicting traffic synthesizers in a non-virtualized system and virtualized system are provided. As shown in FIG. 2, in a non-virtualized system, one or more traffic synthesizers 202 may be used to measure realistic vs. ideal traffic. Each traffic synthesizer 202 may be in communication with one or more non-coherent interconnect modules 204, which may be configured to measure the impact of interconnect IP features. The system may further include one or more microprocessor clusters 206, which may be in communication with a cache coherent interconnect ("CCI") 208. The microprocessor clusters 206 may be configured to measure L2 snoop performance. The cache coherent interconnect 208 may measure CCI feature impact. A DDR controller 210 may communicate with the non-coherent interconnect 204 and cache coherent interconnect 208 and may measure the DDR architecture and feature impact. The virtualized system 300 shown in FIG. 3 may also include a system memory management unit ("MMU") 312 that may measure the impact translation lookaside buffer ("TLB") size may have with different traffic.

Some electronic designs (e.g., System-on-a-chip "SoCs") may be designed to optimize localized traffic. For example, in ARM CA9 architecture, cache line accesses are 32 bytes, beyond CA9 64 byte. The DDR controllers may be affected by row, column, bank, page breaks as these may reduce DDR efficiency to less than 100%. In some embodiments, system MMU's may operate in blocks of virtual memory in units defined by the ARM v7 and v8 architecture, 4 kB, 64 kB, 1 MB, etc.

In some embodiments, an interconnect may operate much like a mixer. Accordingly, the interconnect may receive predictable traffic patterns and mix them in unpredictable ways. Embodiments of the present disclosure may be designed to capture interconnect centric traffic and traffic patterns and analyze the same. Typically, IP developers may know the burst types and bandwidth of their IPs, however, they are unable to articulate the address noise that their IP generates.

Embodiments of traffic determination process 10 may be configured to measure this address noise. Typically IPs generate sequences of addresses when bursting data to/from memory. In some cases, these could be incrementing or decrementing addresses sequences. The concept of address noise may refer to a measure of the frequency of discontinuities in these address sequences. Given DDR controllers generally attempt to predict and identify close sequences of related addresses, as the amount of address noise will directly affect system performance. Defining Translation Lookaside Buffer (e.g., page table caches in MMUs) sizes may dramatically affect silicon area and performance. As such, the ability to measure the size/performance trade-offs may require realistic address noise traffic (e.g. for SATA, PCIe, NVME, etc.).

Figure 4:
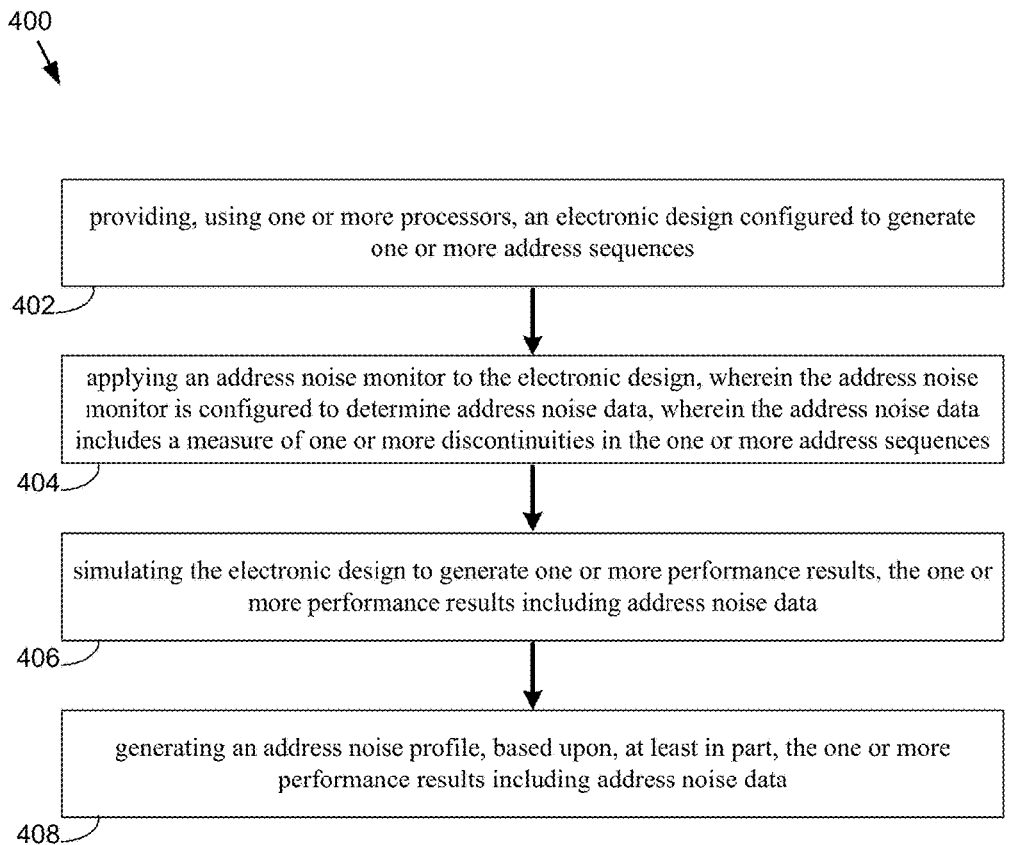
FIG. 4 is a flowchart depicting operations consistent with the traffic determination process of the present disclosure.

Accordingly, and referring now to FIG. 4, embodiments of traffic determination process 10 may include providing (402), using one or more processors, an electronic design configured to generate one or more address sequences. Embodiments may also include applying (404) an address noise monitor to the electronic design, wherein the address noise monitor is configured to determine address noise data, wherein the address noise data includes a measure of one or more discontinuities in the one or more address sequences. Embodiments may further include simulating (406) the electronic design to generate one or more performance results, the one or more performance results including address noise data. Embodiments may also include generating (408) an address noise profile, based upon, at least in part, the one or more performance results including address noise data. Traffic determination process 10 will be discussed in further detail hereinbelow.

Figure 5:
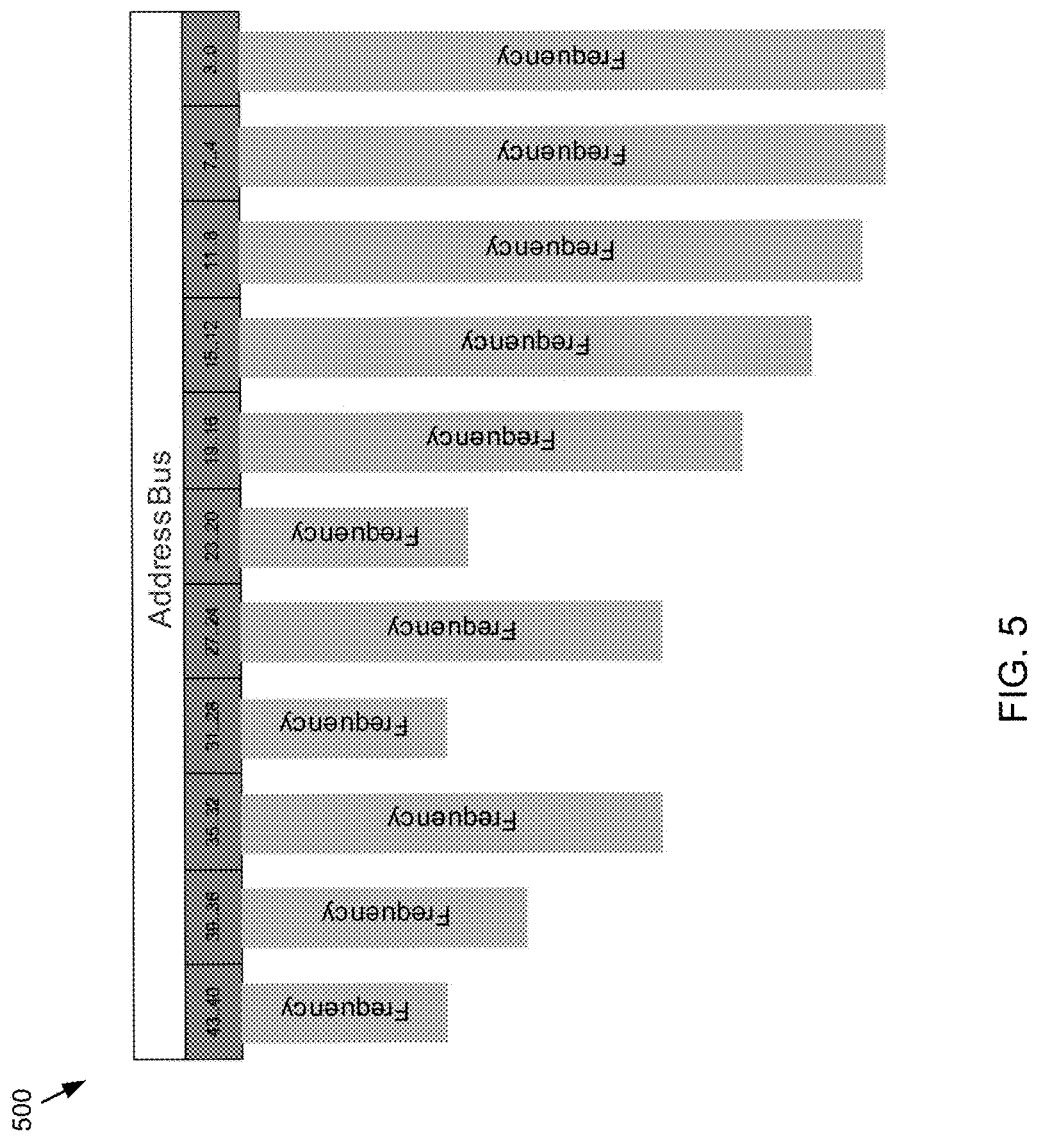
FIG. 5 is a system diagram depicting aspects of the traffic determination process in accordance with an embodiment of the present disclosure.

Referring now to FIG. 5, an embodiment depicting the concept of address noise as it relates to address bus 500 is provided. Address noise may be measured by parsing the address into small segments and measuring the discontinuity frequency. FIG. 5 shows an example of this type of approach. Address noise frequency may be computed based on identifying discontinuities in the address bins and counting them over a defined time (e.g. per million clocks). For example, If address !=expected address=>discontinuity. In some embodiments, the expected address would be based on a number of factors, some of which may include, but are not limited to, burst direction (e.g., incrementing/decrementing), burst step (e.g., byte, word, dword, etc.), etc. For example, for DWORD, INCR burst expected address=address+4.

Figure 6:
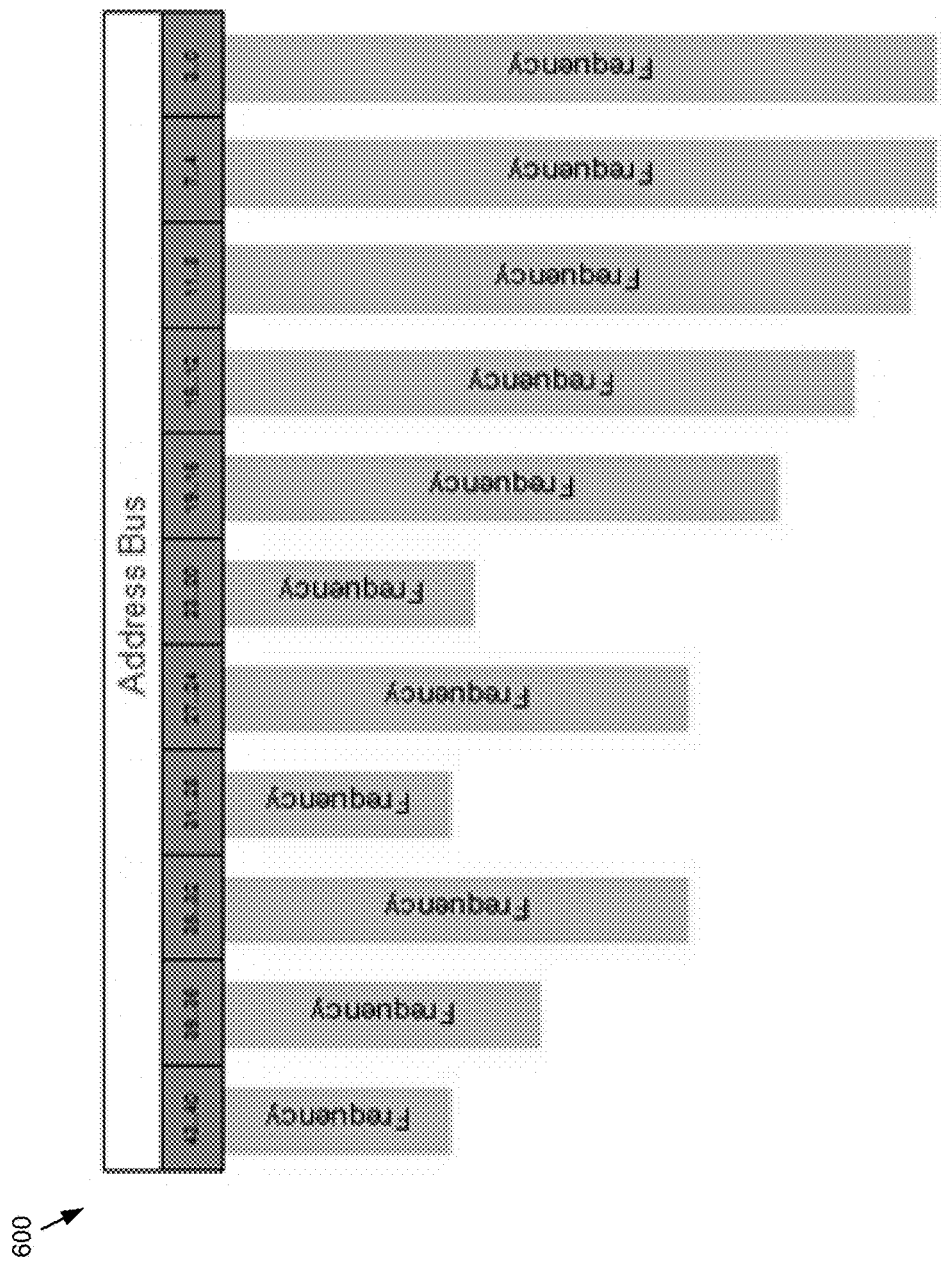
FIG. 6 is a system diagram depicting aspects of the traffic determination process in accordance with an embodiment of the present disclosure.

Referring now to FIG. 6, another embodiment depicting the concept of address noise as it relates to address bus 600 is provided. Existing systems are unable to measure address noise as most IP testbenches run for variable times and, as a result, frequency computation and normalization is difficult. Moreover, in some instances, regular 4-bit slices may not align with the particular processor architecture.

Figure 7:
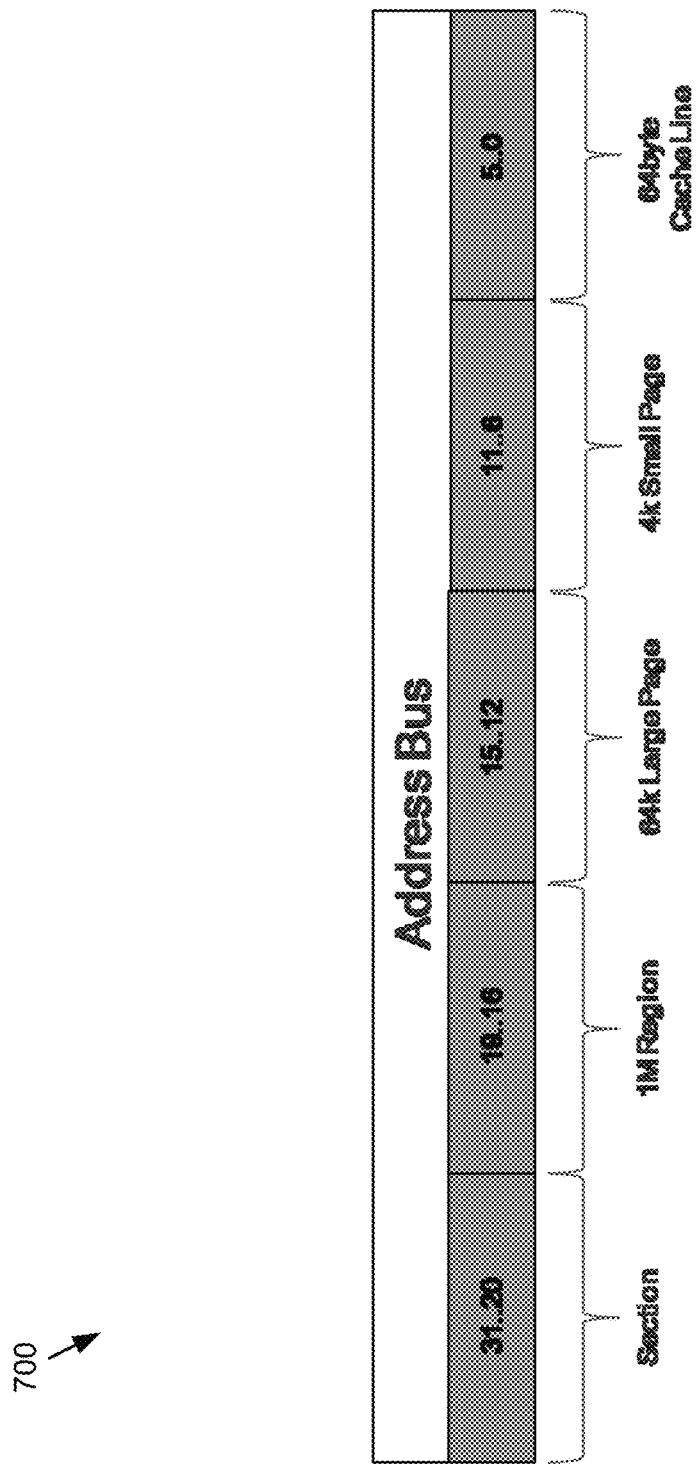
FIG. 7 is a system diagram depicting results generated in accordance with the traffic determination process consistent with an embodiment of the present disclosure

Referring now to FIG. 7, embodiments of traffic determination process 10 may be configured to refine a number of address bins associated with an address bus of the electronic design. In this way, refining the bins to align with a particular architecture (e.g. ARM) the measurement may be directed towards the key areas of interest. For example, for the ARM v7 architecture this provides the ability to identify key bins that are of most importance to the hardware.

Figure 8:
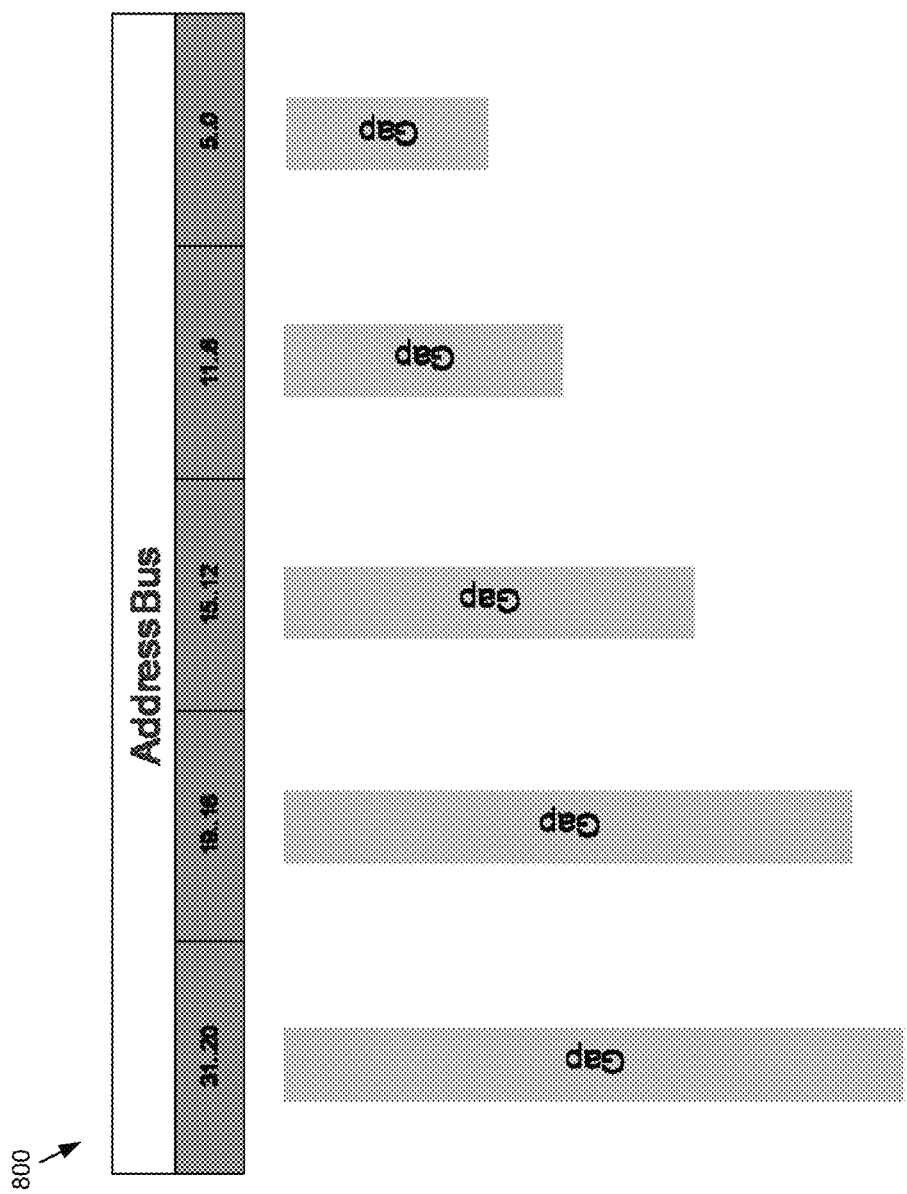
FIG. 8 is a system diagram depicting aspects of the traffic determination process in accordance with an embodiment of the present disclosure.

Referring now to FIG. 8, an embodiment of traffic determination process 10 depicting gaps associated with address bus 800 is provided. In some embodiments, traffic determination process 10 may be configured to determine and/or measure one or more gaps between each discontinuity. Accordingly, measuring the discontinuity "gap" may allow IP developers to run any simulation and measure the gaps. Once this information has been obtained the traffic may be reproduced using one or more simulators (e.g. those available from the assignee of the present disclosure). In this way, traffic determination process 10 may allow for the generation of an Address Noise Signature, which may be based upon this obtained information.

In operation, traffic determination process 10 may be configured to measure the address discontinuity gap. In some embodiments, a counter per address bin may be defined. A monitor (e.g. AMBA monitor) may be attached to a particular IP and simulations may be performed. While incrementing all of the counters for every sequential transfer traffic determination process 10 may be configured to count the inter-discontinuity gap. If a discontinuity occurs, the process may reset the appropriate bins and capture the sample value for averaging and variance. Variance allows the designer to provide variability in the synthesis of new traffic, which may be of importance in corner case scenarios. Accordingly, traffic determination process 10 may be configured to determine a variance associated with each of the address bins.

When the simulation finishes the counters that match the total number of transfers are reviewed and set to maxINT (they have never had a discontinuity). Accordingly, the longer a simulation is run the more accurate the averaged gap values become. Embodiments of traffic determination process 10 may operate successfully regardless of how long the simulation is run for, without requiring normalization. This may also allow designers to regenerate the traffic at different bandwidth intensities and still retain the same address noise signature (ANS).

A table showing address bin, average gap, and variance information that may be used in determining address noise signature is provided below. Regenerating traffic using an Address Noise Signature and simulators (e.g. those available from the assignee of the present disclosure) may result in a constrained random discontinuity generator.

TABLE 1

| Address Bin | Avg Gap | Variance |
| --- | --- | --- |
| Address [5 . . . 0] | 0 | 0 |
| Address [11 . . . 6] | 12 | 1 |
| Address [15 . . . 12] | 33 | 4 |
| Address [19 . . . 16] | 127 | 8 |
| Address [31 . . . 20] | MaxInt | 0 |

Embodiments of traffic determination process 10 may be used to capture the address noise signature, or a family of ANSs, for a given IP. In this way, designers may be able to model more realistic system behavior specifically around DDR performance, as they may be layered on top of a number of VIPs connected to a particular interconnect. The interconnect may mix these traffic streams down to the DDR and provide more useful analysis of DDR performance. A particular ANS may be defined relative to specific architectures (e.g. ARM v7, v8, etc.) such that for a given SoC architecture it is a matter of connecting the appropriate traffic synthesizers and layering the appropriate ANS models on top of them. Using the monitors to capture ANS could also be a way that CPU based benchmarks could be run and captured for generic replay.

Figure 9:
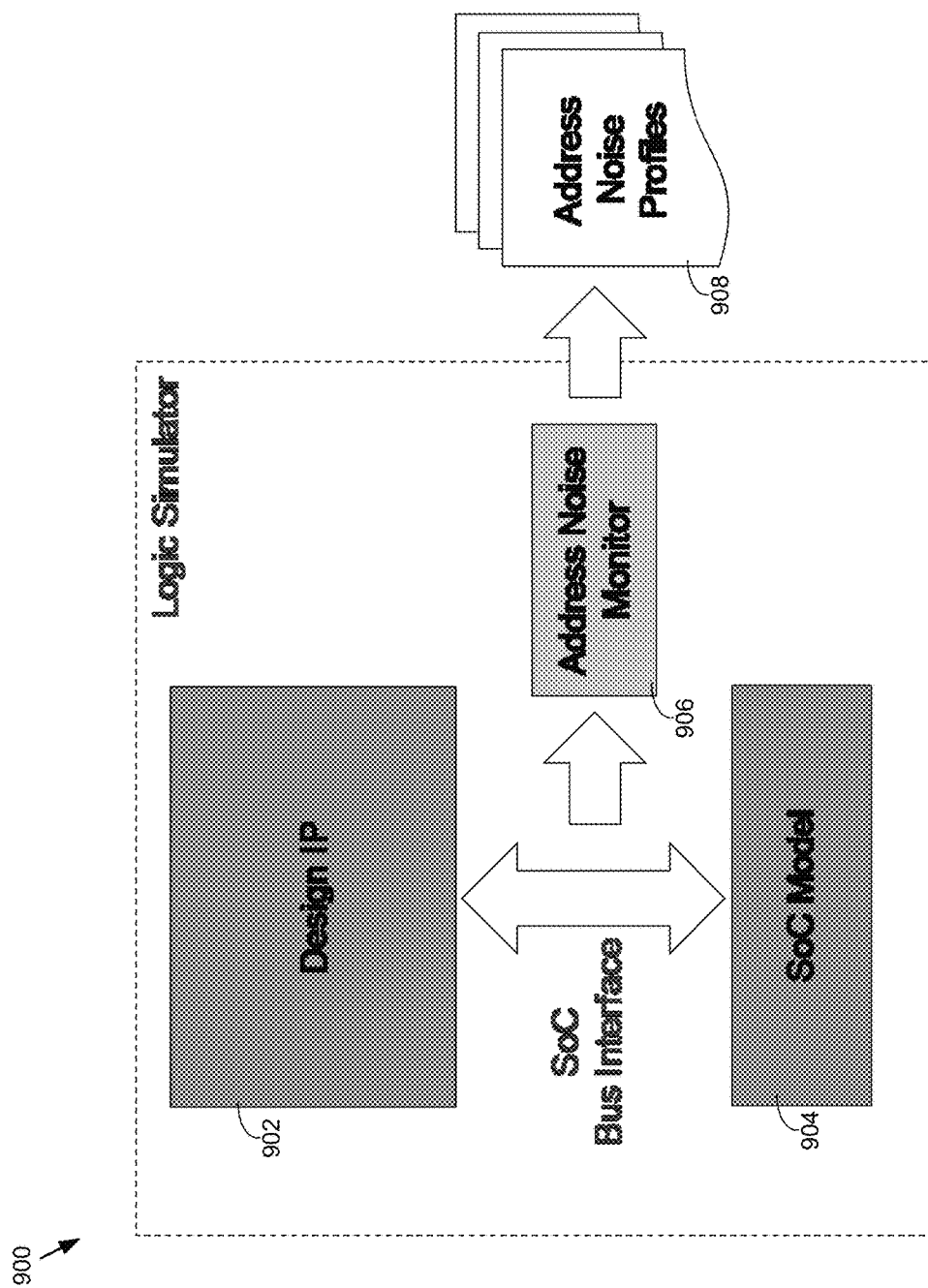
FIG. 9 is a system diagram depicting aspects of the traffic determination process in accordance with an embodiment of the present disclosure.

Referring now to FIG. 9, an embodiment of traffic determination process depicting one particular example for capturing IP address noise is provided. As shown in FIG. 9, traffic determination process 10 may be used in conjunction with design IP 902 and SoC model 904. In this particular example, and as discussed herein, address noise monitor 906 may allow for the generation of one or more address noise profiles 908.

Figure 10:
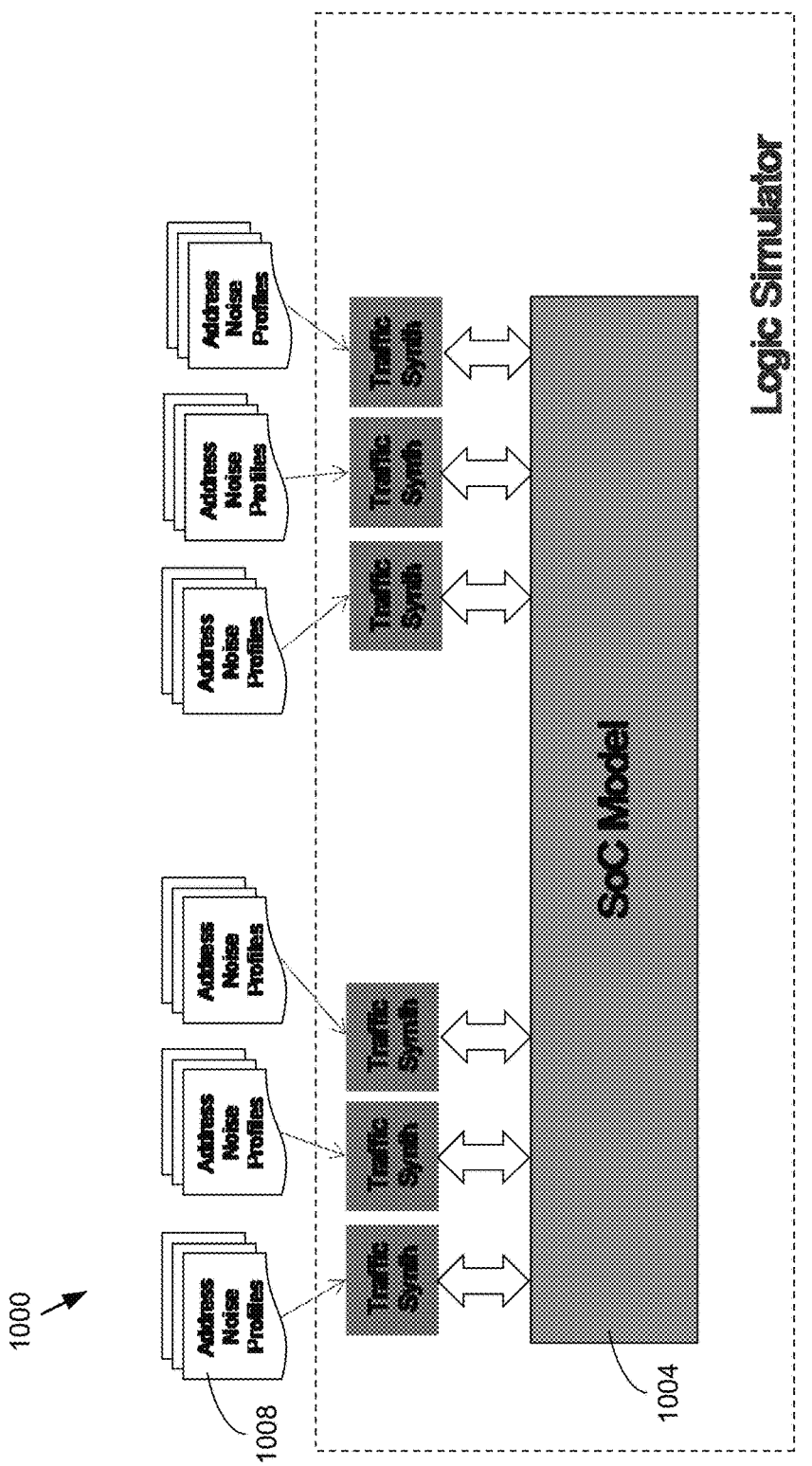
FIG. 10 is a system diagram depicting aspects of the traffic determination process in accordance with an embodiment of the present disclosure.

In some embodiments, and referring also to FIG. 10, traffic determination process 10 may utilize the generated address noise profiles in a second simulation. In this way, the address noise profile generated in FIG. 9 may be applied to a second electronic design such as that shown in FIG. 10. Accordingly, traffic determination process 10 may be configured to simulate the second electronic design including the address noise profile. The first and second electronic design may be of the same design, different designs, and/or any combination thereof.

Figure 11:
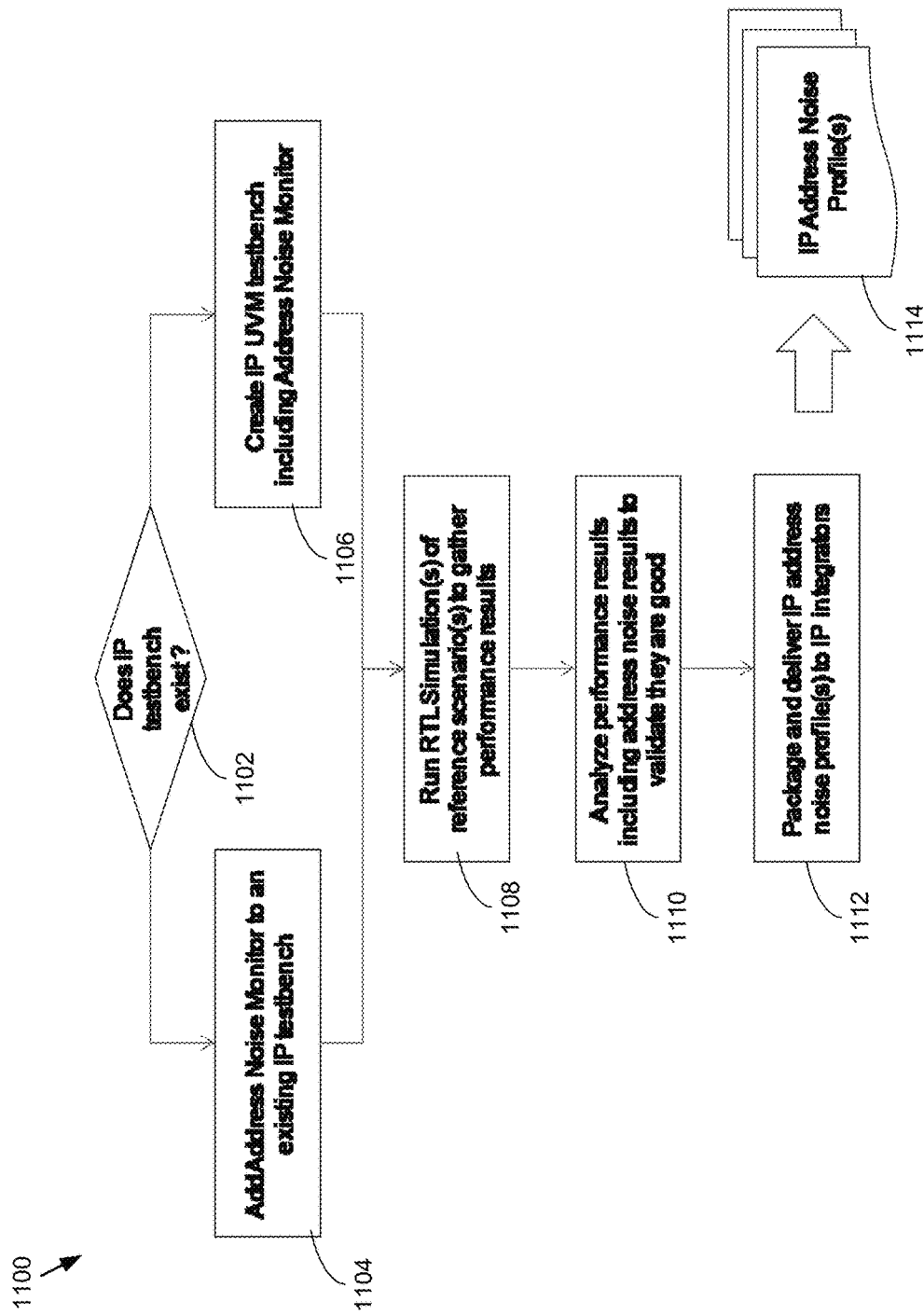
FIG. 11 is a system diagram depicting aspects of the traffic determination process in accordance with an embodiment of the present disclosure.

Referring now to FIG. 11, an embodiment of traffic determination process 10 depicting an example IP developer use model is provided. In operation, a determination 1102 is made whether or not an IP testbench exists. If so, an address noise monitor may be added 1104 to an existing IP testbench. If not, an IP UVM testbench may be created 1106, which may include the address noise monitor discussed herein. Once the Address noise monitor capabilities exist, the process may include running 1108 RTL simulations of reference scenarios to gather performance results. The performance results may be analyzed to validate whether or not they are good (this may include analyzing the address noise information). Once the IP address noise profiles have been generated they may be packaged 1112 and delivered to IP integrators.

Figure 12:
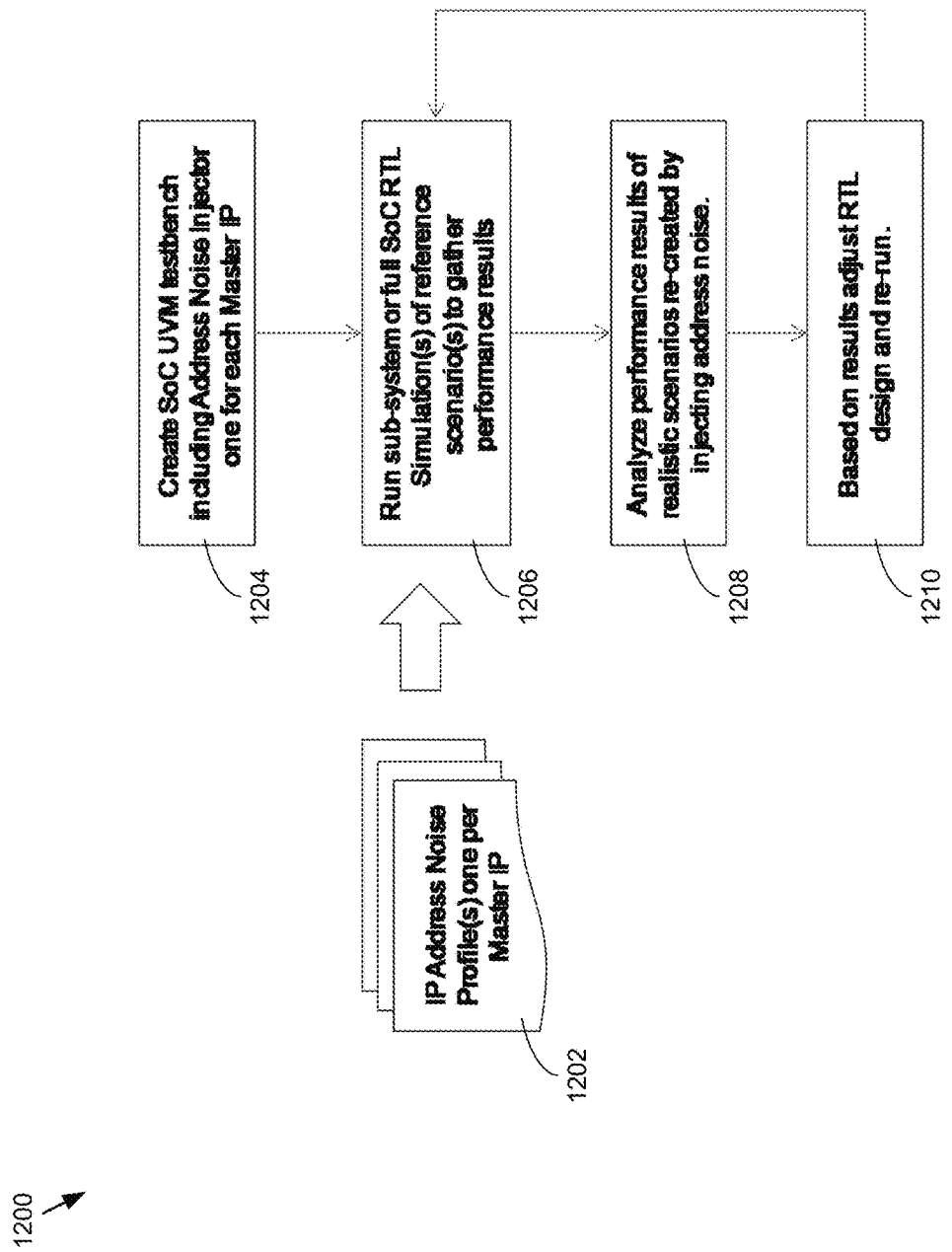
FIG. 12 is a system diagram depicting aspects of the traffic determination process in accordance with an embodiment of the present disclosure.

Referring now to FIG. 12, an embodiment of traffic determination process 10 depicting an example IP integrator use model is provided. In operation, an IP address noise profile may be received 1202 per master IP. An SoC UVM testbench may be created 1204 including an address noise injector for each master IP. At this point, either a sub-system or full SoC RTL simulation may be run 1206 of reference scenarios in order to gather performance results. Address noise may be injected into one or more scenarios and performance results may be obtained and analyzed 1208. Using these results, the RTL design may be adjusted 1210 and re-simulated.

In some embodiments, EDA application 20 and/or traffic determination process 10 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 and/or traffic determination process 10 may be configured to fuel testbench automation, analysis, and reuse for increased productivity. EDA application 20 may be configured to ensures verification quality by tracking industry-standard coverage metrics, including functional, transactional, low-power, and HDL code, plus automatic data and assertion checking. EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may supports e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators. EDA application 20 may incorporate some or all of the aspects of traffic determination process 10 described herein.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for measuring address noise in an electronic design simulation comprising:
providing, using one or more processors, a first electronic design configured to generate one or more address sequences;
defining a plurality of address noise monitors, wherein each of the address noise monitors is defined relative to a particular System-on-a-chip architecture associated with the first electronic design;
identifying the first address noise monitor from the plurality of address noise monitors;
applying the first address noise monitor to the first electronic design, wherein the first address noise monitor is configured to determine address noise data, wherein the address noise data includes a measure of one or more discontinuities in the one or more address sequences;
simulating the electronic design to generate one or more performance results, the one or more performance results including address noise data;
generating an address noise profile, based upon, at least in part, the one or more performance results including address noise data;
refining a number of address bins associated with an address bus of the first electronic design to align with the particular System-on-a-chip architecture;
determining a gap between the one or more discontinuities;
determining a variance associated with each of the address bins; and
applying the address noise profile to a second electronic design that includes, at least in part, the particular System-on-a-chip architecture associated with the first electronic design.

2. The computer-implemented method of claim 1, further comprising:
simulating the second electronic design including the address noise profile.

3. The computer-implemented method of claim 1, wherein the first and second electronic design are at least one of the same design and different designs.

4. A non-transitory computer-readable storage medium for measuring address noise in an electronic design simulation, the computer-readable medium having stored thereon instructions that when executed by a machine result in the following operations:
providing, using one or more processors, a first electronic design configured to generate one or more address sequences;
defining a plurality of address noise monitors, wherein each of the address noise monitors is defined relative to a particular System-on-a-chip architecture associated with the first electronic design;
identifying first address noise monitor from the plurality of address noise monitors;
applying the first address noise monitor to the first electronic design, wherein the first address noise monitor is configured to determine address noise data, wherein the address noise data includes a measure of one or more discontinuities in the one or more address sequences;
simulating the electronic design to generate one or more performance results, the one or more performance results including address noise data;
generating an address noise profile, based upon, at least in part, the one or more performance results including address noise data;
refining a number of address bins associated with an address bus of the first electronic design to align with the particular System-on-a-chip architecture;
determining a gap between the one or more discontinuities;
determining a variance associated with each of the address bins; and
applying the address noise profile to a second electronic design that includes, at least in part, the particular System-on-a-chip architecture associated with the first electronic design.

5. The computer-readable storage medium of claim 4, further comprising:
simulating the second electronic design including the address noise profile.

6. The computer-readable storage medium of claim 4, wherein the first and second electronic design are at least one of the same design and different designs.

7. A system for measuring address noise in an electronic design simulation comprising:
a computing device having at least one processor configured to provide an electronic design configured to generate one or more address sequences, the one or more processors further configured to define a plurality of address noise monitors, wherein each of the address noise monitors is defined relative to a particular architecture, the one or more processors further configured to identify an appropriate address noise monitor from the plurality of address noise monitors, the one or more processors further configured to apply the appropriate address noise monitor to the electronic design, wherein the appropriate address noise monitor is configured to determine address noise data, wherein the address noise data includes a measure of one or more discontinuities in the one or more address sequences, the one or more processors further configured to simulate the electronic design to generate one or more performance results, the one or more performance results including address noise data, the one or more processors further configured to generate an address noise profile, based upon, at least in part, the one or more performance results including address noise data, the one or more processors further configured to refine a number of address bins associated with an address bus of the first electronic design to align with the particular System-on-a-chip architecture, determine a gap between the one or more discontinuities, and determine a variance associated with each of the address bins, wherein the at least one processor is configured to apply the address noise profile to a second electronic design that includes, at least in part, the particular System-on-a-chip architecture associated with the first electronic design.

8. The system of claim 7, wherein the at least one processor is configured to simulate the second electronic design including the address noise profile.

9. The system of claim 7, wherein the first and second electronic design are at least one of the same design and different designs.

* * * * *